H. GUTHRIE.
DEMOUNTABLE RIM.
APPLICATION FILED AUG. 26, 1918.
1,330,758.
Patented Feb. 10, 1920.
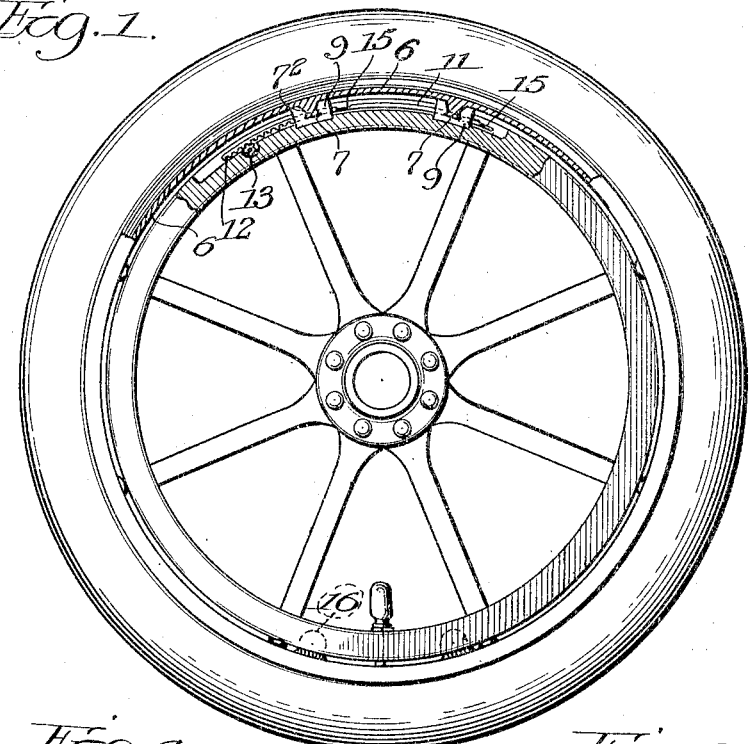
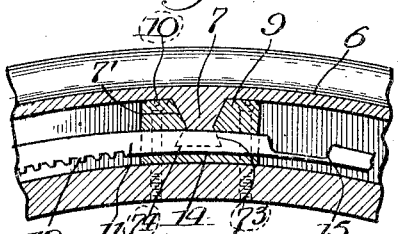
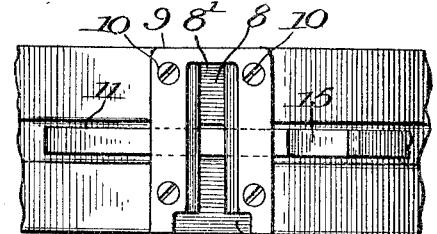
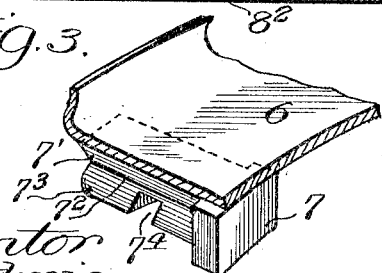
Inventor
Harris Guthrie
by Zabel & Mueller
Attys.

UNITED STATES PATENT OFFICE.

HARRIE GUTHRIE, OF CHICAGO, ILLINOIS.

DEMOUNTABLE RIM.

1,330,758.  Specification of Letters Patent.  Patented Feb. 10, 1920.

Application filed August 26, 1918. Serial No. 251,371.

*To all whom it may concern:*

Be it known that I, HARRIE GUTHRIE, a citizen of the United States, residing at Chicago, in the county of Cook and State of Illinois, have invented a certain new and useful Improvement in Demountable Rims, of which the following is a full, clear, concise, and exact description, reference being had to the accompanying drawings, forming a part of this specification.

My invention relates to demountable rims for automobile wheels and has to do more particularly with means for fastening the rim on the wheel proper. One of the principal features of my invention is the use of a single operating element which is adapted to unlock the rim from the wheel so that it may be readily removed. In the ordinary wheel now in general use of the kind described herein, a number of bolts must be operated before the rim may be secured to or removed from the wheel. In my invention I provide locking mechanism in the form of a circumferentially movable locking key which is adapted to interlock with coöperating locking lugs on the rim so as to hold the rim on the wheel.

For better understanding of my invention reference is to be had to the accompanying drawing in which—

Figure 1 is a side elevation of an automobile wheel showing my invention applied thereto, part of the wheel being shown in section so as to disclose the locking device;

Fig. 2 is a view of a section of the felly of the wheel showing the guide for receiving the locking lug and the circumferentially movable locking bolt;

Fig. 3 is a perspective view of a portion of the rim showing the locking lug;

Fig. 4 is a section through the rim and felly of the wheel showing the locking parts; and Fig. 5 is a side view of a portion of the felly showing the locking key operating device.

Referring now more in detail to the preferred form of my invention it comprises a rim 6 of any standard make and carrying a T-shaped locking lug 7 adapted to enter a lateral slot 8 in a guide block 9 which is set into the felly of the wheel and suitably secured thereto preferably by means of bolts 10. The recess 8 and coöperating portion 7' are of such shape that the lug and rim are held against outward movement, this being secured preferably by means of a notched construction 7² as shown more clearly in Figs. 1, 3, and 4. The slot 8 is preferably closed at 8' and the head of the T-shaped lug 7 is adapted to fit into the enlarged recess 8², this end construction being adapted to exclude dirt from the coöperating elements 7 and 8. In order that the rim may be more readily placed upon the wheel and removed therefrom I preferably round the end 7³ of the lug 7 as shown in Fig. 3.

Up to this point I have referred simply to the construction of one of the coöperating locking elements but as indicated in Fig. 1 a plurality of such locking devices may be provided, two of them being shown in this figure. As will be apparent the rim may be slid on and off the wheel, the locking lug 7 coöperating with the lateral slot in the guide block 9.

Now in order to lock the rim on the wheel against lateral displacement I provide a locking bolt preferably in the form of a circumferentially movable rod 11 which carries a rack 12 coöperating with a pinion 13 suitably journaled in the felly of the wheel and having a socketed end 13' (Fig. 5) adapted to receive a key for rotating the pinion. A suitable cover plate 14 is attached to the side of the felly for excluding dirt and water from the pinion.

The locking bolt 11 extends through holes 14 in the guides 9 as will be apparent from Fig. 4, said bolt 11 being recessed at 15 for each locking lug 7 so that when the bolt is withdrawn and the recesses 15 register with the slots 8, the rim may be slid off of the wheel. In order to secure a more positive lock by means of the bolt I preferably have the bolt slightly tapered so as to wedge in the openings 14 of the guide blocks 9 and the recess 7⁴ in the locking lug. Thus as the bolt is forced into locking position it is held by the wedging thereof against the sides of the slots in the guide block and locking lug.

If desired any number of such circumferentially disposed locking devices may be employed but I preferably apply them simply on one side of the wheel and provide fixed coöperating lugs and recesses on the opposite side of the wheel as shown at 16. For this purpose I preferably secure a fixed lug to the rim and a fixed coöperating recess to the felly of the wheel, the parts thus engaging to hold the rim in place. In placing the rim on the wheel the fixed locking elements 16 are first engaged and then the bolt side of the rim which carries locking lugs 7 is slid on to the felly of the wheel. The pinion is then rotated to lock the rim upon the wheel.

In describing my invention I referred to the preferred form which is illustrated in the drawing but I contemplate applying my invention in other ways than that shown and therefore I do not desire to be limited to the exact structure shown and described but aim to cover all that which comes within the spirit and scope of the appended claims.

I claim:

1. A demountable rim for automobiles comprising a rim having circumferentially recessed lugs, guides for the wheel each having a lateral slot to receive a lug, a circumferentially movable locking bolt extending along only a portion of the circumference of the wheel for engagement with the lug recesses to hold one side of the rim on the wheel, and a fixed coöperating lug and recess opposite said first said lugs to hold the other side of the rim on the wheel.

2. A demountable rim mechanism of the character described comprising a felly, a guide block set into the felly, a recess in the block having one end closed, a circumferential groove in the felly extending across the block and recess, a bolt extending along only a portion of the circumference of the wheel slidable in the groove, a rack on the bolt, a pinion mounted in the felly and adapted to move the bolt longitudinally in the groove, a rim, a lug on the rim adapted to engage said recess with a locking fit and having a head to close the other end of the recess, a groove in the lug adapted to aline with the first named groove when the rim is placed in the felly and be engaged by said bolt, a recess in the felly diametrically opposite the first recess, and a fixed lug on the rim for engaging said second recess.

3. A demountable rim mechanism of the character described comprising a felly, a dovetail recess in the felly, a bolt movable circumferentially in the felly across the recess, a rim, a dovetail lug on the rim engaging the recess with a locking fit and a groove in said lug adapted to be engaged by said bolt, a recess in the felly diametrically opposite the first recess and a fixed lug on the rim for engaging said second recess.

4. A demountable rim mechanism of the character described comprising a felly, a dovetail recess in the felly, a bolt movable circumferentially in the felly across the recess, a rim, a dovetail lug on the rim engaging the recess with a locking fit, a groove in said lug adapted to be engaged by said bolt, said bolt being tapered so as to wedge in the groove of said lug, and a recess in the felly diametrically opposite the first recess and a fixed lug on the rim for engaging said second recess.

In witness whereof, I hereunto subscribe my name this 23rd day of August, A. D., 1918.

HARRIE GUTHRIE.